United States Patent [19]
Dove

[11] Patent Number: 5,950,699
[45] Date of Patent: Sep. 14, 1999

[54] BRUSH SAW ATTACHMENT FOR BRUSH RAKE ATTACHMENT FOR FRONT END LOADERS AND THE LIKE

[76] Inventor: Ralph E. Dove, 15749 Dove Rd., Green Ridge, Mo. 65332

[21] Appl. No.: 09/178,437

[22] Filed: Oct. 23, 1998

[51] Int. Cl.⁶ .......................... A01G 23/08; B27B 11/00; E02F 3/00
[52] U.S. Cl. .............. 144/34.6; 37/301; 37/302; 30/379; 144/34.1; 144/336; 414/723
[58] Field of Search .................. 37/301, 302, 468, 37/403, 405, 409; 414/723; 144/34.1, 34.6, 336; 83/523, 846, 852, 928

[56] References Cited

U.S. PATENT DOCUMENTS

| | | |
|---|---|---|
| 2,309,223 | 1/1943 | Staring . |
| 2,615,262 | 10/1952 | Reid, Sr. . |
| 2,722,758 | 11/1955 | Loftin et al. . |
| 3,033,253 | 5/1962 | Purdy . |
| 3,119,421 | 1/1964 | Marine . |
| 3,302,671 | 2/1967 | Basham . |
| 3,804,138 | 4/1974 | Adcock ................................. 144/34.6 |
| 3,809,135 | 5/1974 | Dove . |
| 4,164,247 | 8/1979 | Wolf ....................................... 144/34.6 |
| 5,079,864 | 1/1992 | Roy . |
| 5,685,689 | 11/1997 | Schneider et al. . |

FOREIGN PATENT DOCUMENTS 1091548  12/1980  Canada .

*Primary Examiner*—W. Donald Bray
*Attorney, Agent, or Firm*—Litman, Kraai & Brown L.L.C.

[57] ABSTRACT

A land clearing apparatus comprises a brush saw which is removably attachable to a brush rake which is in turn removably attachable to a vehicle such as a front end loader or a bulldozer. The brush saw comprises a wedge shaped blade with a clamping assembly mounted on a rear end thereof and extending thereabove. The clamping assembly includes opposed clamping members adapted to engage portions of the brush rake from opposite directions for removably securing the brush saw to the brush rake.

9 Claims, 2 Drawing Sheets

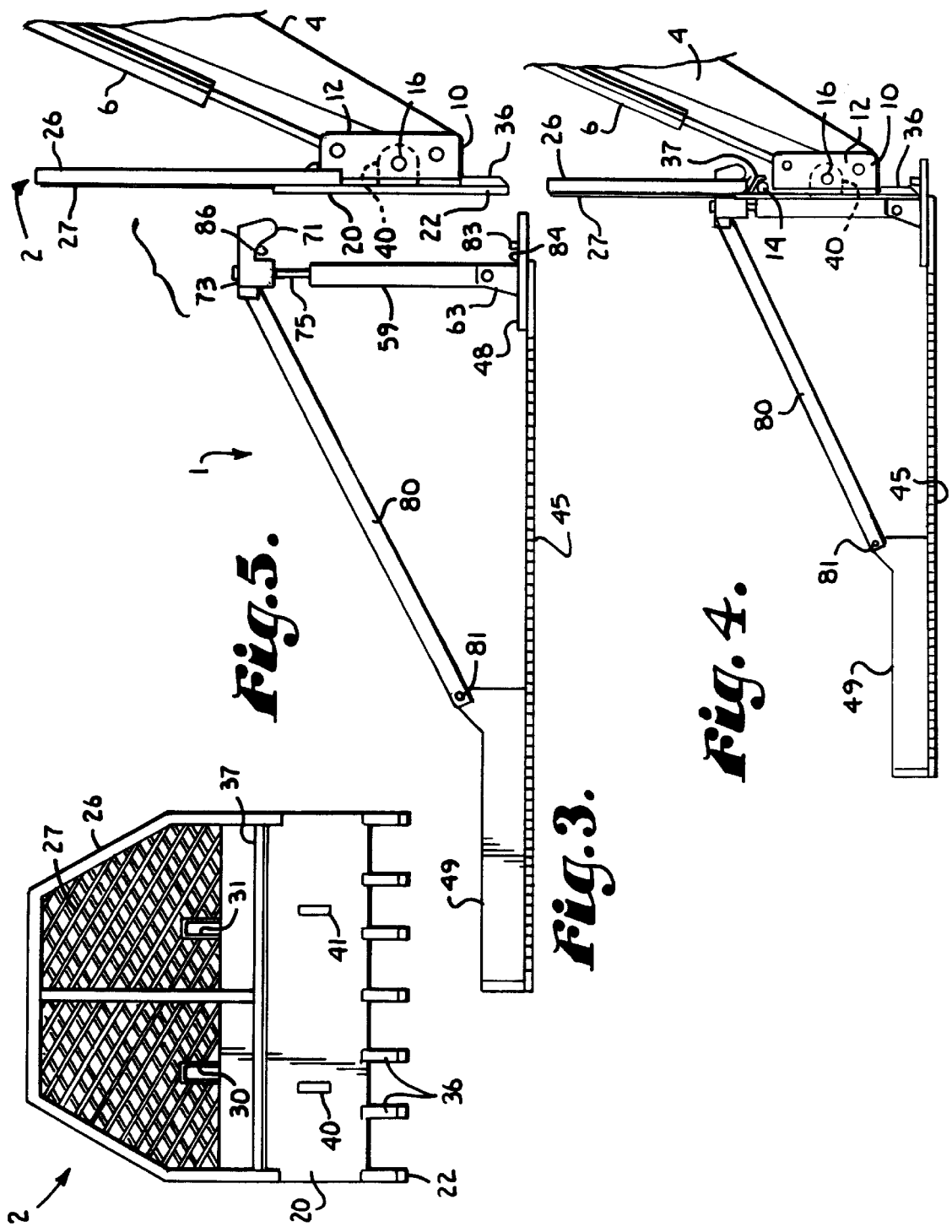

BRUSH SAW ATTACHMENT FOR BRUSH RAKE ATTACHMENT FOR FRONT END LOADERS AND THE LIKE

BACKGROUND OF THE INVENTION

The present invention relates to brush saw attachments for front end loaders and the like and in particular a brush saw removably attachable to a brush rake which is in turn removably attachable to front end loaders and the like.

It is well known to provide front end loaders and bulldozer type vehicles with a removable saw attachment for use in cutting brush and trees. See for example my U.S. Pat. No. 3,809,135. After the brush and trees are cut, the brush saw is removed and it is common to then attach a brush rake to the vehicle for use in pushing or raking the brush into a pile for burning or subsequent removal. The process of removing the brush saw from the vehicle and then attaching a brush rake is time consuming and often difficult due to the size and weight of the brush rake and the difficulty in maintaining the brush rake vertical while attempting to connect it to the vehicle.

SUMMARY OF THE INVENTION

The present invention comprises a brush saw which is removably attachable to a brush rake which is in turn removably attachable to a vehicle such as a front end loader or a bulldozer.

The brush rake includes a plurality of tines extending in spaced apart relation vertically across a bottom of a pusher plate. The brush rake further includes mounting structure on a rear surface of the pusher plate adapted to facilitate attachment to the lift arms and lift cylinders of a front end loader.

The brush saw includes a pair of blades secured together in an angled relationship to form a wedge shaped cutting plate. A clamping assembly is mounted on the rear of the brush saw. The clamping assembly includes a pair of downwardly angled clamping jaws mounted to the upper end of and extending rearward from a clamping frame which is mounted towards the rear of the cutting plate. An upwardly extending lip is formed on an upper surface of the cutting plate behind the clamping frame. The height of the clamping frame is adjustable to draw the clamping jaws toward or away from the cutting plate.

A pair of slots, sized and spaced to receive the clamping jaws, are formed in a screen extending above the pusher plate of the brush rake. With the clamping frame in a fully extended alignment, the brush rake is advanceable toward the brush saw such that the clamping jaws pass through the slots in the brush rake screen and the brush rake tines pass over the upwardly extending lip on the brush saw cutting plate until the brush rake pusher plate abuts against the clamping frame. The clamping frame is then compressed or retracted to pull the clamping jaws toward the cutting plate such that the downwardly angled clamping jaws engage portions of the upper edge of the pusher plate which defining lower edges of the slots, and lower ends of the tines are advanced into a trough extending between the clamping frame and the upwardly extending lip on the rear of the cutting blade so as to removably secure the brush saw to the brush rake.

OBJECTS AND ADVANTAGES OF THE INVENTION

The objects of this invention include providing a brush saw which is removably securable to a brush rake which is in turn removably securable to a front end loader, bulldozer or the like; to provide such a saw which may be used to support the brush rake when not in use; to provide such a saw which may be adapted for securement to a variety of brush rakes; to provide such a brush saw which is relatively easy to manufacture; to provide such a brush saw which is relatively easy to attach to a brush rake.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a right side elevational view of showing the brush saw attachment separated from the brush rake attachment which is secured to the front end loader, only front portions of which are shown.

FIG. 4 is a view similar to FIG. 3 of reduced scale showing the brush saw attachment secured to the brush rake attachment and with portions broken away to show details of the attachment mechanism for attaching the brush rake to the front end loader.

FIG. 5 is a reduced, rear elevational view of the brush rake attachment.

DETAILED DESCRIPTION OF THE INVENTION

Figure 1:
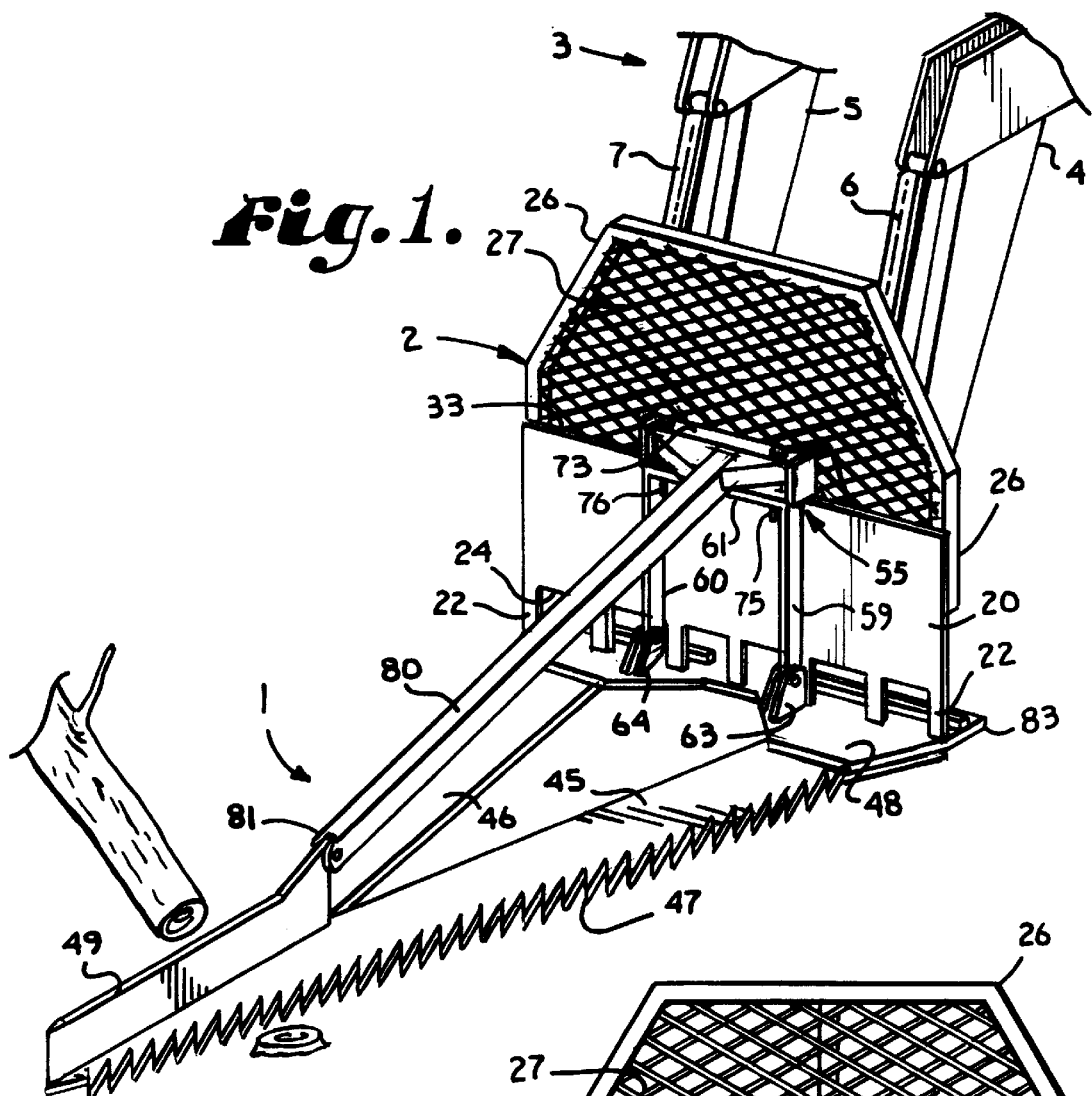
FIG. 1 is a perspective view showing a brush saw attachment which is secured to a brush rake attachment which is secured to a front end loader, only front portions of which are shown.
Figure 2:
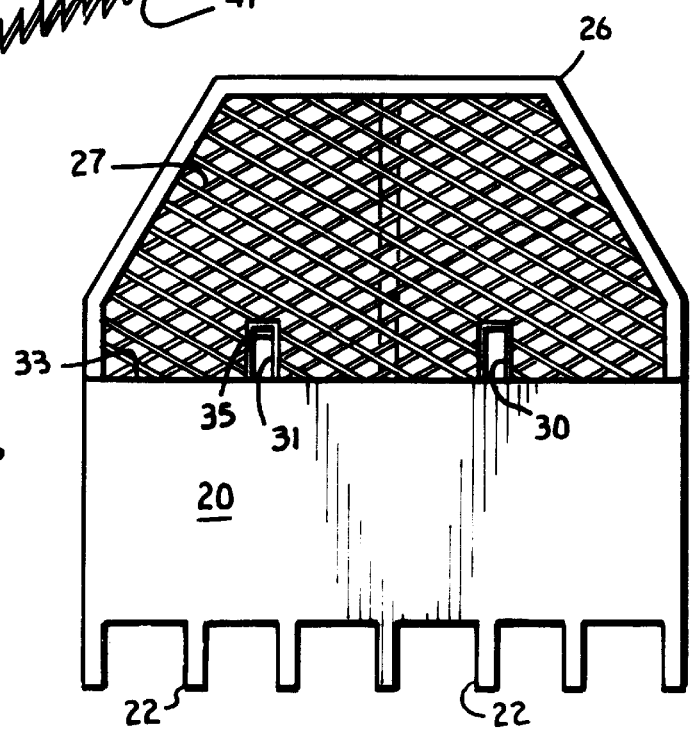
FIG. 2 is a front plan view of the brush rake attachment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 refers to a brush saw attachment for a brush rake attachment 2 for a front end loader or related vehicles 3. Only portions of the front end loader 3 are shown, namely lift arms 4 and 5 and tilt cylinders 6 and 7.

Referring to FIGS. 3 and 4, a first quick attach assembly 10 is shown pivotally attached to distal ends of lift arm 4 and tilt cylinder 6. The quick attach assembly 10 may be of the type shown in U.S. Pat No. 5,685,689 to Schneider et al. and assigned to Great Bend Manufacturing Co., Inc., or other quick attach assemblies well known in the art. A second quick attach assembly 11 (not shown but of identical construction) is pivotally connected to the distal ends of lift arm 5 and tilt cylinder 7. Each quick attach assembly 10 and 11 includes a mounting bracket 12 with an alignment member 14 secured to a front and upper end thereof and an attachment pin 16 securable within a pin receiving bore (not shown) extending therethrough.

The brush rake attachment comprises a pusher plate 20 formed from a sheet of steel with a plurality of tines 22 extending below a bottom edge 24 thereof. A frame 26 is welded to the rear of the pusher plate 20 and extends above the pusher plate 30. A metal screen or grate 27 is welded to the frame 26 and generally extends in vertical planar alignment with the pusher plate 20. A first and second slot 30 and 31 extend through the grate 27 just above an upper edge 33 of the pusher plate 20. Trimming may be secured to the grate 27 around the slots 30 and 31 to cover jagged edges. Reinforcement plates 36 are welded to the backs of the tines 22 to provide additional strength and support for the tines 22.

A downwardly angled channel member or lip 37 is secured to and extends across a rear surface of the pusher plate 20 proximate an upper end thereof. Portions of the bottom of the channel member 37 are closed off except for a pair of alignment slots (not shown) into which the alignment members 14 of the quick attachment assemblies 10 and 11 may be inserted providing a first point of contact therewith. First and second attachment flanges 40 and 41 are welded to and extend rearward from a rear surface of the pusher plate 20. The flanges 40 and 41 are sized and positioned such that pin receiving bores extending therethrough are aligned with the pin receiving bores in the mounting brackets 12 of the quick attachment assemblies 10 and 11. Attachment pins 16 may be manually or automatically inserted through the aligned pin receiving bores in the flanges 40 and 41 and the attachment brackets 12 of the quick attachment assemblies 10 and 11 respectively to secure the brush rake attachment 2 to the front end loader 3.

The brush saw attachment 3 comprises a pair of saw blades 45 and 46 secured together in a wedge shape with their teeth 47 extending outward therefrom. The blades 45 and 46 are secured at a rear end or base thereof to a mounting plate 48 by welding or bolting. The blades 45 and 46 are secured together at a front end or apex thereof by welding or bolting to a connector bar 49.

A mounting or clamping assembly 55 is mounted on the rear of the brush saw attachment 1. The clamping assembly 55 comprises an inverted U-shaped clamping frame 57 having legs 59 and 60 with cross bar 61 mounted to and extending between upper ends thereof. Lower ends of the legs 59 and 60 are pivotally mounted to clevis mounts 63 and 64 respectively which are welded to the mounting plate 48. A pair of downwardly angled clamping jaws or upper clamping members 71 and 72 are mounted on opposite ends of an upper cross member 73. The upper cross member 73 is secured to the cross bar 61 of clamping frame 57 in upwardly spaced and generally parallel alignment by bolts 75 and 76. The bolts 75 and 76 extend through smooth bores in the upper cross member 73 and threaded bores in the cross bar 61 such that rotation of bolts 75 and 76 draws the cross bar 61 toward or away from the upper cross member 73.

A support strut 80 is welded at a first end to the front of the upper cross member 73, and is pivotally connected at a pivot joint 81 to a rear end of the connector bar 49.

An upwardly extending lip 83 is formed on the mounting plate 48 in spaced relation behind the clamping frame 55 so as to generally form a trough 84 between the lip 83 and clamping frame 55. The portion of the mounting plate 48 extending rearward from the clamping frame 55 may be referred to as a lower clamping member.

The clamping jaws 71 and 72 extend rearwardly from the upper cross member 73. A notch 86 is formed in a lower surface of each jaw 71 and 72 such that each jaw 71 and 72 has a dog ear shape and a distal end of each jaw 71 and 72 generally extends downward or is angled downward.

The slots 30 and 31 are sized and positioned to receive the clamping jaws 71 and 72. The clamping jaws 71 and 72 and the slots 30 and 31 in the grate 27 are spaced apart an equivalent distance. In addition, the slots 30 and 31 are slightly wider than the clamping jaws 71 and slightly taller than the height of the clamping jaws 71 and 72.

The upper cross member 73 and the clamping frame 55 are advanceable relative to each other generally between an fully extended alignment and a retracted or compressed alignment. When the cross member 73 and the clamping frame 55 are in a fully extended alignment, the distance between a lower edge of the clamping jaws 71 and 72 and an upper end of the upwardly extending lip 83 on the mounting plate 48 is slightly greater than the distance from the lower ends of the tines 22 and the upper edge 33 of the pusher plate 20 (which corresponds to a lower edge of slots 30 and 31).

To secure the brush saw attachment 1 to the brush rake attachment 2, the cross member 73 and the cross bar 61 are positioned in a fully extended alignment. The brush rake attachment 2, mounted on the front end loader 3 is then advanced toward the rear of the brush saw attachment 1. With slots 30 and 31 in the brush rake attachment 2 aligned with the clamping jaws 71 and 72 respectively on the brush saw attachment 1, brush rake attachment 2 is advanced toward the rear of the brush saw attachment 1 until the pusher plate 20 abuts against the rear of the clamping frame 55, such that the clamping jaws 71 and 72 extend through slots 30 and 31 respectively and the tines 22 are positioned directly above the trough 84.

The brush rake attachment 2 is then lowered vertically until the lower edge of the tines 22 rests against an upper surface of the mounting plate 48 and a lower rear surface of each reinforcement plate 36 for each tine 22 abuts against the upwardly extending lip 83. The bolts 75 and 76 are then tightened to draw the upper cross member 73 and the clamping jaws 71 and 72 attached thereto downward toward the cross bar 61 and into a retracted alignment wherein the portions of the upper edge 33 of the pusher plate 33 extending across the bottom of the slots 30 and 31 extend into the notches 86 in the clamping jaws 71 and 72 respectively. The pusher plate 20 is thereby clamped between the clamping jaws 71 and 72 and the mounting plate 48.

It is foreseen that a wide variety of means including other clamping means could be utilized for removably securing the brush saw attachment to the brush rake attachment. For example, the upper ends of the bolts 75 and 76 could be connected to eccentric cam acting levers which draw the bolts upward upon rotation of the levers downward so as to draw the cross bar 61 and cross member 73 together. Similarly, hydraulic actuators could by used to draw cross bar 61 and cross member 73 together.

It is also foreseen that the brush saw attachment 1 could be adapted for use with brush rake attachments of configurations other than that disclosed. For example, it is foreseen that the brush saw attachment 1 could be adapted for use with a brush rake attachment generally comprising a plurality of vertically aligned arcuate tines formed in an arcuate framework as disclosed in U.S. Pat No. 5,079,864. It is foreseen that the pusher plate 20 as disclosed above could be formed from a plurality of vertically aligned elongated tines secured together in a framework similar to that disclosed in U.S. Pat. No. 5,079,864. It is also to be understood that the grate 27 may be considered part of said pusher plate 20.

Referring to the drawings, the brush saw attachment 1 is shown extending in front of the brush rake attachment 2 which is mounted to the front of a front end loader 3. It is to be understood, that the brush rake attachment 2 could be adapted for mounting to the rear of a vehicle, such as a tractor, such that the brush saw attachment extends rearward or behind the brush rake attachment 2 and the tractor.

It is also foreseen that structure for securing the saw attachment to the brush rake attachment could be mounted on the brush rake attachment.

It is to be understood that while certain forms of the present invention have been illustrated and described herein, it is not to be limited to the specific forms or arrangement of parts described and shown.

What is claimed and desired to be secured by Letters Patent is as follows:

1. A land clearing apparatus for removable connection to a vehicle; said apparatus comprising:
   (a) a brush rake including a plurality of downwardly extending tines; said brush rake being removably securable to said vehicle; and
   (b) a saw having a blade; said saw being removably securable to said brush rake such that said saw extends beyond said brush rake.

2. The land clearing apparatus as in claim 1 wherein said saw further comprises:
   (a) a clamping assembly secured to said blade for removably clamping said saw to said brush rake.

3. The land clearing apparatus as in claim 1 wherein:
   (a) said blade is wedge shaped.

4. The land clearing apparatus as in claim 1 wherein:
   (a) said saw comprises:
      (i) a clamping assembly including an upper clamping member and a lower clamping member secured thereto such that said upper and lower clamping members are selectively advanceable toward and away from each other; said lower clamping member adapted to engage said brush rake along a lower edge of said tines; said upper clamping member adapted to downwardly engage a portion of said brush rake.

5. The land clearing apparatus as in claim 4 wherein:
   (a) said upper clamping member comprises an upper clamping jaw secured to and extending rearward from an upper frame member;
   (b) said lower clamping member comprises a lower clamping jaw secured to and extending rearward from a lower frame member; said upper and lower frame members secured together for selective advancement toward and away from each other; and
   (c) said portion of said brush rake engaged by said upper clamping member extending across a bottom edge of a slot extending through said brush rake; said slot sized for extension of a portion of said upper clamping jaw therethrough.

6. A saw for use with a brush rake for a vehicle; said brush rake having a plurality of downwardly extending tines; said saw comprising:
   (a) an connection assembly removably securable to said brush rake; and
   (b) a saw blade secured to said connection assembly such that said saw blade extends beyond said brush rake when said connection assembly is secured to said brush rake.

7. The saw as in claim 6 wherein:
   (a) said saw blade is wedge shaped.

8. The saw as in claim 6 wherein:
   (a) said connection assembly comprises an upper clamping member and a lower clamping member secured together and selectively advanceable toward and away from each other; said lower clamping member adapted to upwardly engage a first portion of said brush rake and said upper clamping member adapted to downwardly engage a second portion of said brush rake.

9. A land clearing apparatus for removable connection to a vehicle; said apparatus comprising:
   (a) a brush rake attachment including a pusher plate having a plurality of tines extending downwardly therefrom; said brush rake being removably securable to said vehicle;
   (b) a saw attachment comprising:
      (i) a clamping assembly including an upper clamping member secured to and extending rearward from an upper frame member; a lower clamping member connected to and extending rearward from a lower frame member; said upper and lower frame members secured together for selective advancement of said upper and lower clamping members between an extended alignment and a retracted alignment;
      (ii) a saw blade secured to said clamping assembly proximate a lower end thereof and extending forward of and horizontally relative to said clamping assembly;
   (c) said brush rake having a slot extending therethrough sized to receive a rear end of said upper clamping member and positioned such that a portion of said brush rake extending from a lower edge of said slot to a bottom edge of said tines extends between said upper and lower clamping members when said rear end of said upper clamping member is positioned in said slot and said upper and lower clamping members are in said extended alignment; such that upon subsequent advancement of said upper and lower clamping members to said retracted alignment; said upper clamping member downwardly engages a portion of said brush rake adjacent said slot and said lower clamping member upwardly engages said tines along said bottom edge thereof.

* * * * *